United States Patent [19]
Onishi et al.

[11] Patent Number: 5,581,647
[45] Date of Patent: Dec. 3, 1996

[54] METHOD OF FABRICATING DISPERSION COMPENSATION FIBER

[75] Inventors: Masashi Onishi; Koji Amemiya; Chie Fukuda; Hiroo Kanamori, all of Yokohama, Japan

[73] Assignee: Sumitomo Electric Industries, Ltd., Osaka, Japan

[21] Appl. No.: 519,609

[22] Filed: Aug. 25, 1995

[30] Foreign Application Priority Data

Aug. 26, 1994 [JP] Japan .................................. 6-202091

[51] Int. Cl.$^6$ ................. G02B 6/02; G02B 6/16
[52] U.S. Cl. ............................... 385/123; 65/432
[58] Field of Search ............................ 385/122, 123–126, 385/129, 141, 146, 147; 65/432, 438, 3.11, 10.1; 359/109, 111, 173, 140, 179, 186, 188, 195, 494, 498, 885; 356/73.1, 364

[56] References Cited

U.S. PATENT DOCUMENTS

| | | | |
|---|---|---|---|
| 5,361,319 | 11/1994 | Antos et al. | 385/123 |
| 5,418,881 | 5/1995 | Hart, Jr. et al. | 385/123 |
| 5,430,822 | 7/1995 | Shigematsu et al. | 385/123 |
| 5,448,674 | 9/1995 | Vengsarkar et al. | 385/123 |
| 5,473,719 | 12/1995 | Stone | 385/123 |
| 5,522,004 | 5/1996 | Djupjobacka et al. | 385/123 |

FOREIGN PATENT DOCUMENTS 2101762  1/1983  United Kingdom.

*Primary Examiner*—Akm E. Ullah
*Attorney, Agent, or Firm*—Cushman Darby & Cushman IP Group of Pillsbury Madison & Sutro LLP

[57] ABSTRACT

In a method of fabricating DCF, the fiber is drawn while rotating said optical fiber preform, wherein a rotational speed of said optical fiber preform is 10 to 1,000 rpm, a drawing speed is 50 to 1,000 m/min, and a drawing tension is 2.4 to 13 kg/mm$^2$.

13 Claims, 14 Drawing Sheets

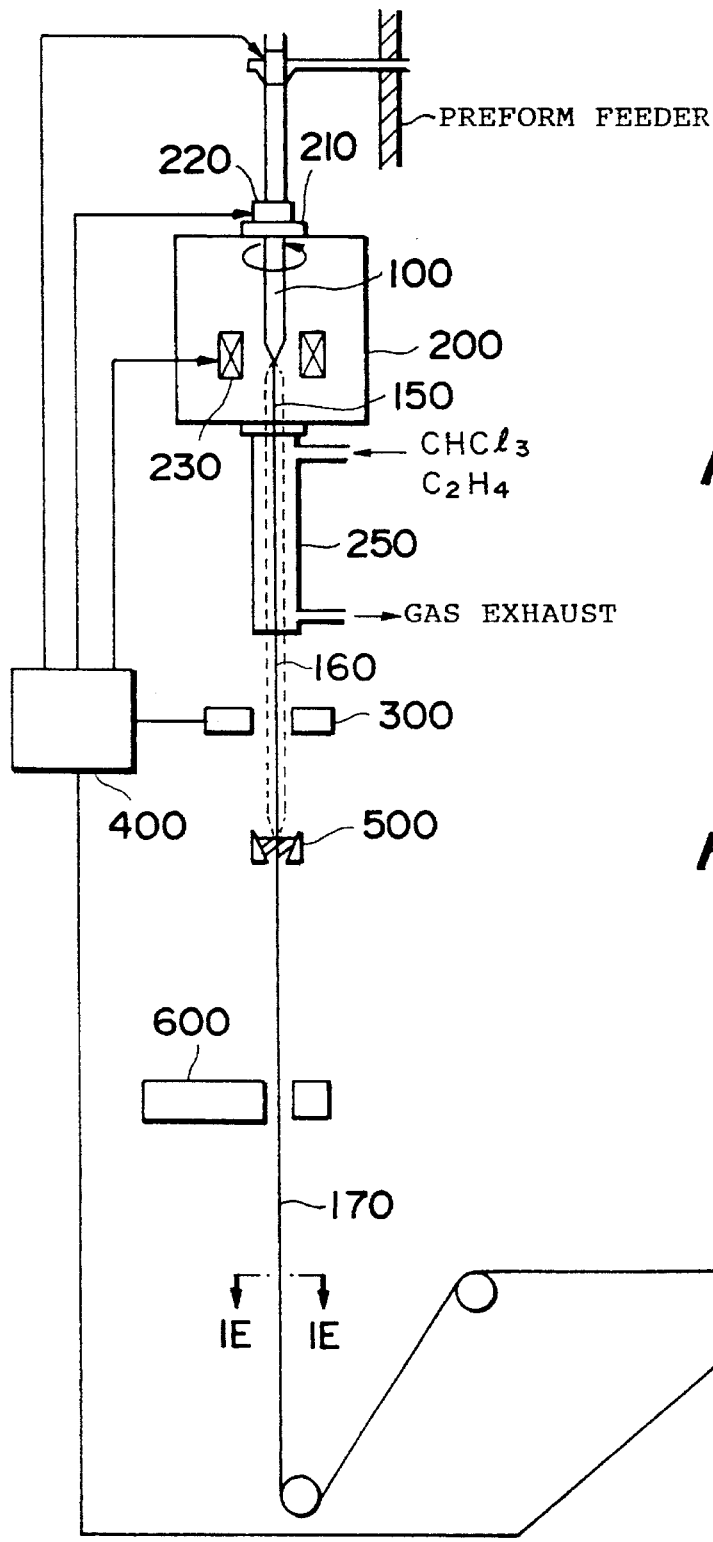
Fig. 1A
Fig. 1B
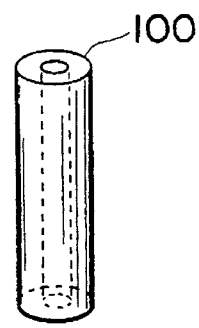
Fig. 1C
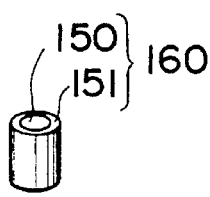
Fig. 1D
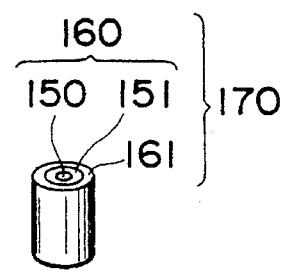

RELATIONSHIP BETWEEN CORE NONCIRCULARITY AND PMD

\* PMD(s/r-km)=B/c
　　WHERE B:BIREFRINGENCE
　　　　　C:SPEED OF LIGHT $3\times10^5$ km/s $$\text{NONCIRCULARITY}(\%) = \frac{D_{max} - D_{min}}{D_{max}} \times 100$$

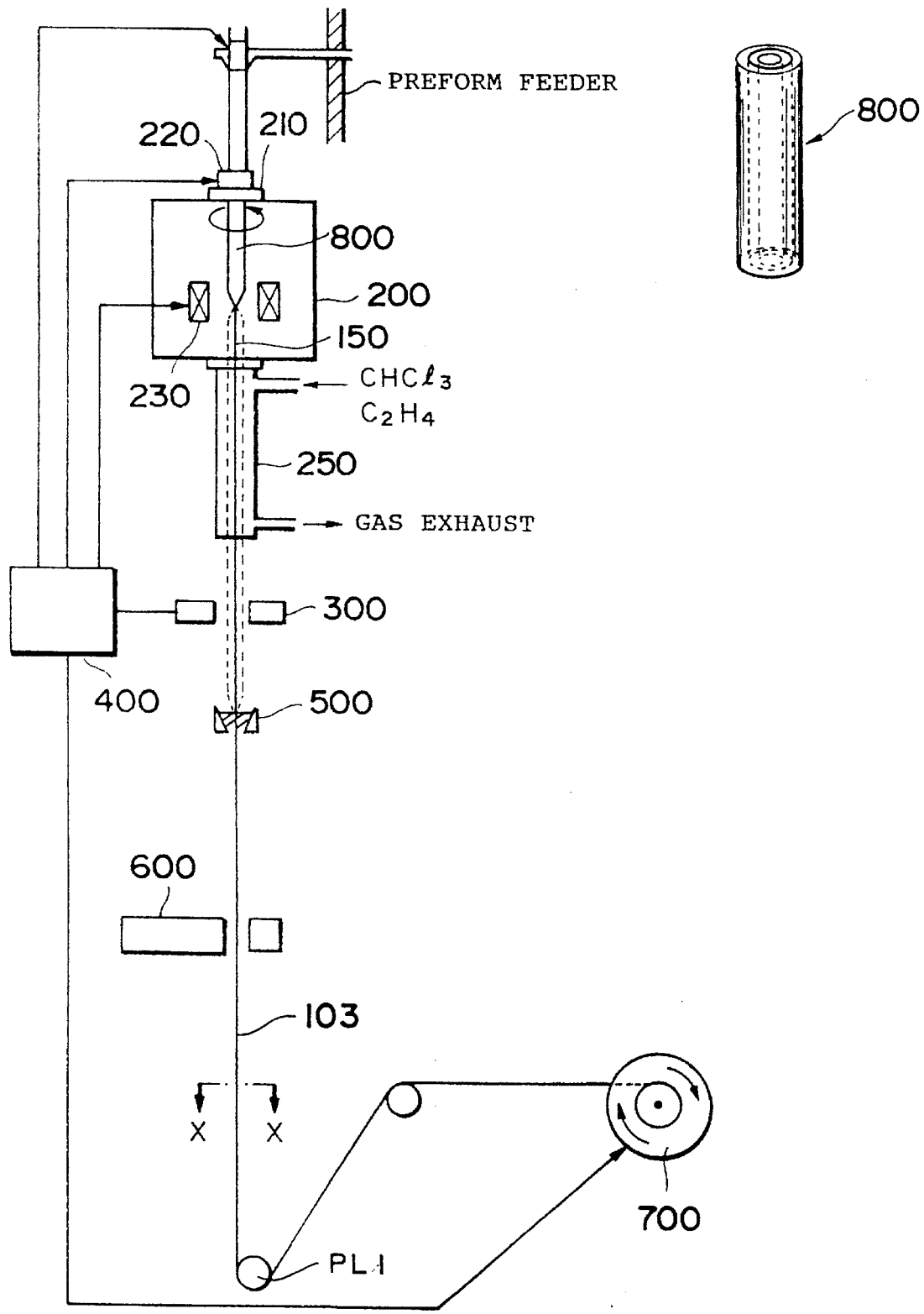

Fig. 9D
Fig. 9E
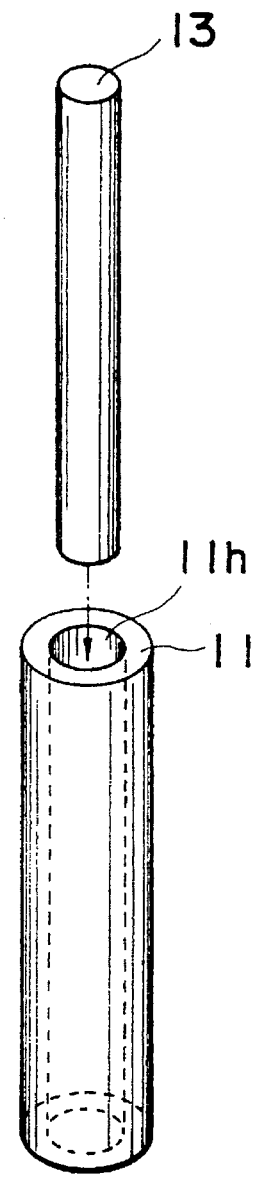
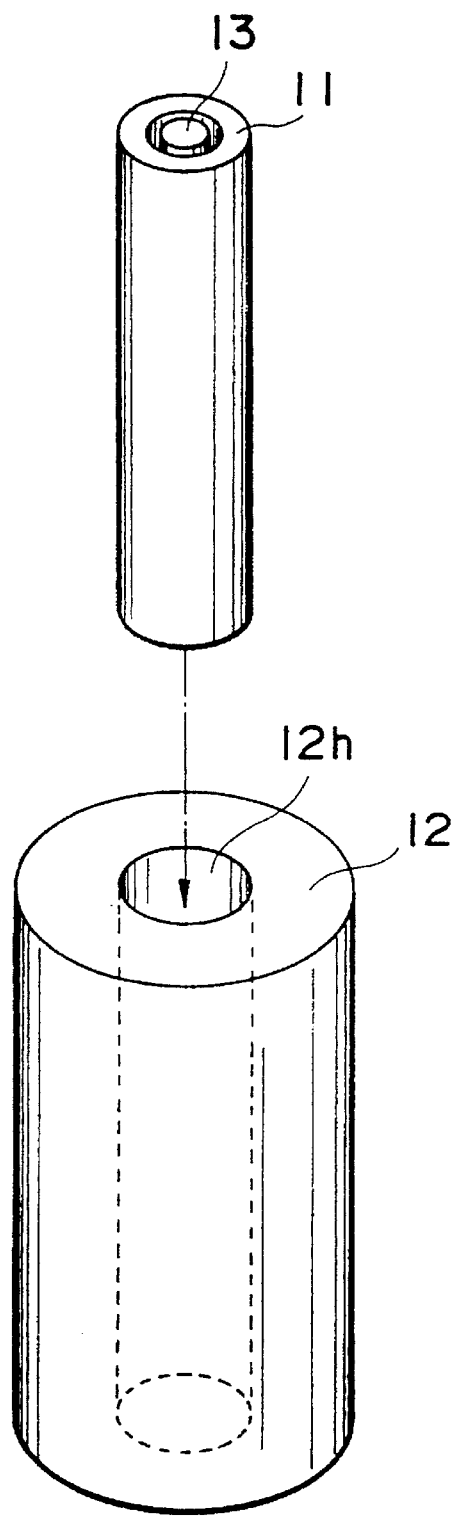

METHOD OF FABRICATING DISPERSION COMPENSATION FIBER

BACKGROUND OF THE INVENTION

1. Field of the Invention

The present invention relates to a dispersion compensation optical fiber (DCF), an optical transmission system using the same, and a method of fabricating the same.

2. Related Background Art

A dispersion compensation fiber is known as a fiber for compensating chromatic dispersion of signal light. Such a dispersion compensation fiber is described in U.S. Pat. No. 5,361,319 to Jhoseph Antos et al. of Corning.

SUMMARY OF THE INVENTION

An optical fiber is fabricated by heating and drawing an optical fiber preform. In a conventional typical drawing process, one end portion of an optical fiber preform is held while suspending the other end at a lower position. The optical fiber preform is heated and softened from the other end portion, thereby sequentially drawing an optical fiber. The optical fiber preform has a portion serving as a core and a portion serving as a cladding.

Unfortunately, however, as for the portion serving as a core and the portion serving as a cladding, it is difficult to obtain a completely round concentric cross section. More specifically, the cross section of an actually fabricated optical fiber preform is not completely round.

Therefore, it is difficult to make the refractive index profile completely concentric for the sectional structure of any part of the optical fiber obtained upon drawing. In other words, the core or the cladding of the optical fiber obtained from the optical fiber preform with a nonround cross section has a slightly elliptical or distorted circular sectional structure, so a completely concentric refractive index profile cannot be obtained.

The fact that the refractive index profile is not completely concentric means that the refractive index profile of the optical fiber changes along the radial direction. Light propagating in the optical fiber has two polarized components perpendicular to each other. These polarized components are perpendicular to the propagation direction of the light, i.e., the longitudinal direction of the optical fiber. If the refractive index profile of the optical fiber changes along the radial direction, a difference in group velocity is generated between the two polarized components. If a difference in group velocity is generated between the two polarized components, polarization mode dispersion occurs. Therefore, as the noncircularity of the optical fiber becomes larger, polarization mode dispersion per unit length becomes larger.

Characteristics allowing long-distance transmission of a large-capacity signal are required for an optical fiber for a submarine cable or a trunk cable. However, if the transmission amount of the signal is large, and the distance of signal transmission is long, an influence of polarization mode dispersion conspicuously appears. In addition, if the core noncircularity is almost the same, polarization mode dispersion value becomes larger as the amount of a dopant to the core, e.g., $GeO_2$ becomes larger.

When the optical fiber preform is drawn while being rotated, the distortion in the cross section uniformly appears at a predetermined interval in all directions of 360° even if no completely round and concentric sectional structure is observed in the core of the obtained optical fiber. Therefore, the entire long and twisted optical fiber can equivalently be regarded as an optical transmission line having a round and concentric sectional structure.

A method of drawing an optical fiber while the optical fiber is twisted (or spun) is described in U.K. Patent Laid-Open No. 2,101,767. In this method, a twist is imparted to the fiber at a rate of 10 to 50 turns per meter. This method is qualitatively excellent. However, when an optical fiber was fabricated as described in the above prior art, the quality of the obtained optical fiber did not allow an application for a submarine cable. Particularly, in the optical fiber fabricated according to the above method, a transmission loss increased because of variations in outer diameter, so the optical fiber could not ensure a sufficient quality allowing an application for a submarine cable. Theoretically, when the number of turns per unit length becomes larger, the polarization mode dispersion can be decreased. However, when the number of turns exceeds five times per meter, the outer diameter of the fiber varies beyond 1 μm.

It is an object of the present invention to provide a dispersion compensation optical fiber having characteristics allowing an application for a submarine cable, and a method of stably fabricating the same.

According to the method of fabricating an optical fiber of the present invention, an optical fiber preform having a portion serving as a core and a portion serving as a cladding, and consisting of a plurality of types of oxide glasses based on silica glass or quartz glass is prepared.

This preform is drawn while being heated. The outer diameter of the optical fiber immediately after drawing is measured by an outer diameter measurement device. The fiber is wound on a bobbin. The drawing speed is proportional to the rotational speed of the bobbin. The bobbin is rotated by a motor connected thereto.

The drawing speed is adjusted on the basis of the value measured by the outer diameter measurement device. When the measured outer diameter is larger than a predetermined value, the rotational speed of the motor is increased to increase the drawing speed. When the measured outer diameter is smaller than the predetermined value, the rotational speed of the motor is decreased to decrease the drawing speed.

During drawing, the optical fiber preform is rotated about a central axis of rotation, i.e., an axis almost parallel to a central axis almost matching the central axis of the optical fiber preform at a rotational speed of 10 to 1,000 rpm. The drawing speed is 50 to 1,000 m/min.

The core noncircularity of this optical fiber preform is 1% or less. The core noncircularity is defined as (Dmax−Dmin)/Dmax, where Dmax is the maximum value of the diameter of the core of the preform, and Dmin is the minimum value of the diameter of the core of the preform. The shape of the resultant fiber is almost the same as that of the fiber preform. Therefore, the noncircularity of the resultant fiber is also 1% or less. The present inventors used a preform having a core noncircularity of 0.35%, thereby fabricating a dispersion compensation fiber having a polarization mode dispersion (PMD) of 0.1 ps/km$^{1/2}$. When the drawing speed was set to 400 m/min, a fiber having a polarization mode dispersion of 0.08 ps/km$^{1/2}$ was obtained.

The rotational speed of the optical fiber preform is more preferably 50 to 600 rpm. The drawing tension during drawing is preferably 2.4 to 13 kg/mm$^2$. The portion serving as the core of the optical fiber preform contains $GeO_2$ at a concentration of 5 mol % or more.

The rotational speed ($v_R$) is selected from a range of 10 to 1,000 rpm. Practically, the selection range of the rotational speed ($v_R$) is preferably set to 50 to 600 rpm. The drawing speed ($v_P$) is set to 50 m/min or more in consideration of the stability of drawing and 1,000 m/min or less from the viewpoint for preventing the fiber from being broken during drawing. As a result of such rotation drawing, an optical fiber having a twist imparted to its core at a length ($L=v_P/v_R$) of 0.05 to 100 m (0.08 to 20 m when the rotational speed is 50 to 600 rpm) is obtained.

In consideration of the viscosity of the silica glass as the base of the optical fiber during softening, the drawing tension is preferably selected from a range of 2.4 to 13 kg/mm² in order to appropriately set the width of swing without breaking.

The polarization mode dispersion poses a problem in an optical fiber having a large specific refractive index difference. However, the fabricating method of the present invention is particularly effective for fabricating an optical fiber having such a large specific refractive index difference. To obtain a large specific refractive index difference, the silica-based optical fiber must contain $GeO_2$ in its core portion at a concentration of 5 mol % or more.

As the preform, an optical fiber preform having a portion serving as a core and a portion serving as a cladding, consisting of a plurality of types of fluoride glasses, and having a portion consisting of fluoride glass containing at least one of $ZrF_4$, $HfF_4$, and $AlF_3$.

This preform having a cladding doped with fluorine is drawn while being heated. The outer diameter of the optical fiber immediately after drawing is measured by an outer diameter measurement device. The drawing speed is adjusted on the basis of the measured value. The optical fiber preform is rotated about a central axis of rotation, i.e., an axis almost parallel to a central axis almost matching the central axis of the optical fiber preform at a rotational speed of 10 to 500 rpm.

At this time, the drawing speed during drawing is preferably 1 to 200 m/min. The drawing tension during drawing is preferably 2.4 to 13 kg/mm². As the outer diameter measurement device, a laser outer diameter measurement device having a detector with a measurable effective area of 1 to 9 mm² is used.

The surface of the resultant optical fiber is hermetically coated with a carbon film upon passing through a reaction tube for forming a carbon film. The surface of the carbon film is coated with a resin.

The rotational speed ($v_R$) is selected from a range of 10 to 500 rpm. The drawing speed ($v_P$) is set to 1 m/min or more in consideration of the stability of drawing and 200 m/min or less from the viewpoint for preventing the fiber from being broken during drawing. As a result of such rotation drawing, an optical fiber having a twist imparted to its core at a length ($L=v_P/v_R$) of 0.002 to 20 m is obtained.

In consideration of the viscosity of the silica glass as the material of the optical fiber during softening, the drawing tension is preferably selected from a range of 2.4 to 13 kg/mm².

When the optical fiber preform is drawn while being rotated, the optical fiber executes a motion corresponding to rotation of one of generators of a spindle between the fixed points of the optical fiber after drawing. Therefore, the laser outer diameter measurement device arranged between the fixed points must measure the outer diameter of a target object moving with respect to the measurement unit. In this case, the laser outer diameter measurement device preferably has a measurable effective area of about 1 to 9 mm².

When a carbon film is to be formed on the surface of the optical fiber through a reaction tube, a carbon film with a high uniformity is formed because the optical fiber executes a spindle-like motion as described above in the reaction tube as well.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a view for explaining a method of fabricating an optical fiber according to the first embodiment;

FIG. 1B is a view showing an optical fiber preform used in the apparatus in FIG. 1A;

FIG. 1C is a view showing an optical fiber coated with carbon;

FIG. 1D is a view showing an optical fiber coated with a jacket;

FIG. 9A is a view for explaining a method of fabricating an optical fiber according to the second embodiment;

FIG. 9B is a view showing an optical fiber preform used in the apparatus in FIG. 9A;

FIG. 9D is a view showing a method of fabricating the optical fiber preform shown in FIG. 9B; and FIG. 9E is a view showing a method of fabricating the optical fiber preform shown in FIG. 9B.

DESCRIPTION OF THE PREFERRED EMBODIMENTS

Figure 1E:
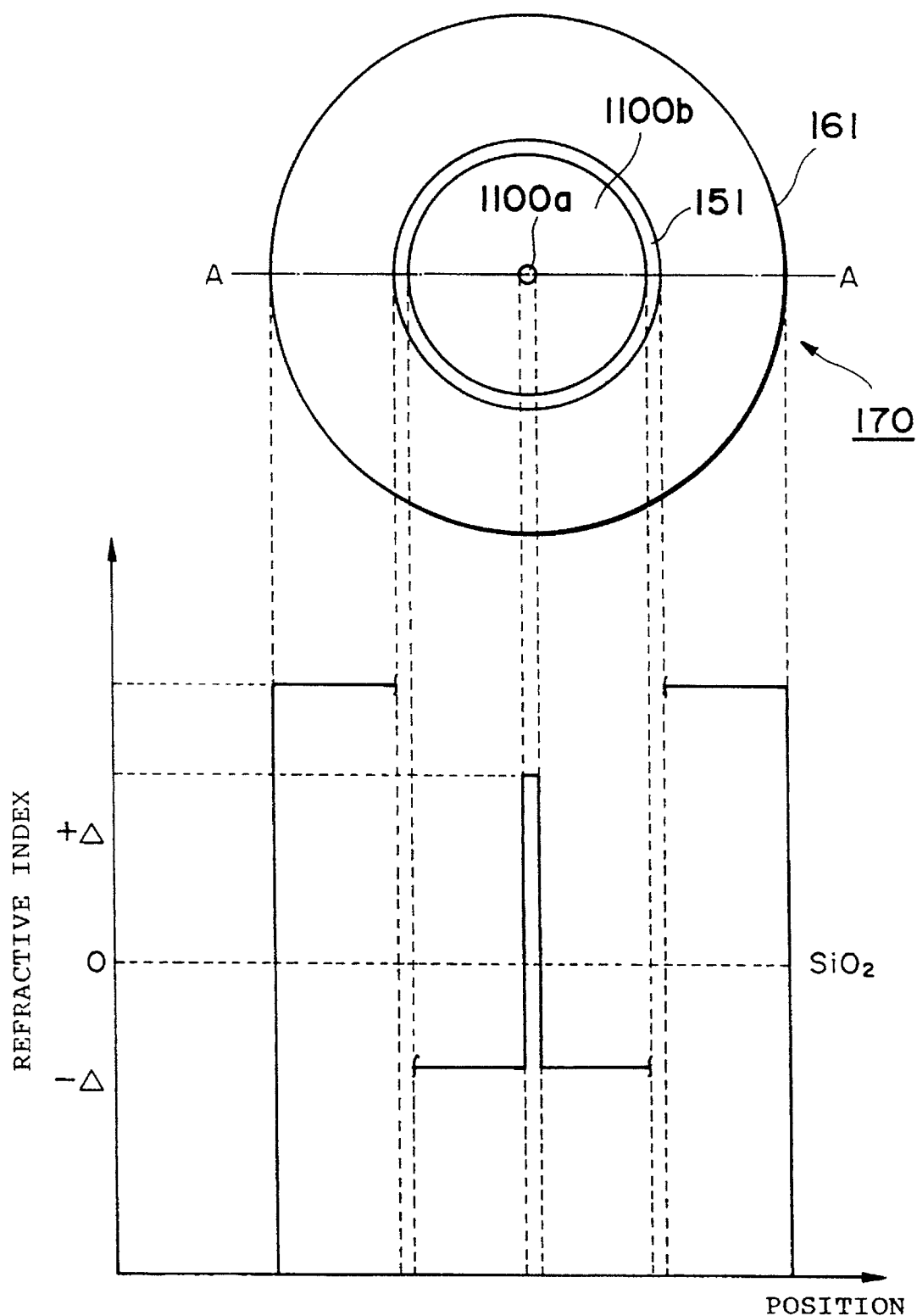
FIG. 1E is a view showing the cross section of the optical fiber taken along an arrow X—X and a refractive index profile thereof.

A method of fabricating an optical fiber according to an embodiment of the present invention will be described below with reference to the accompanying drawings. The same reference numerals denote the same elements throughout the drawings, and a detailed description thereof will be omitted.

As shown in FIG. 1A, in the method of fabricating an optical fiber according to the first embodiment, an optical fiber preform 100 is prepared. The optical fiber preform 100 is fabricated by the vapor-phase axial deposition method (VAD method), the outside vapor phase deposition method (OVD method), the modified chemical vapor deposition method (MCVD method), or the rod-in-tube method.

Figure 2:
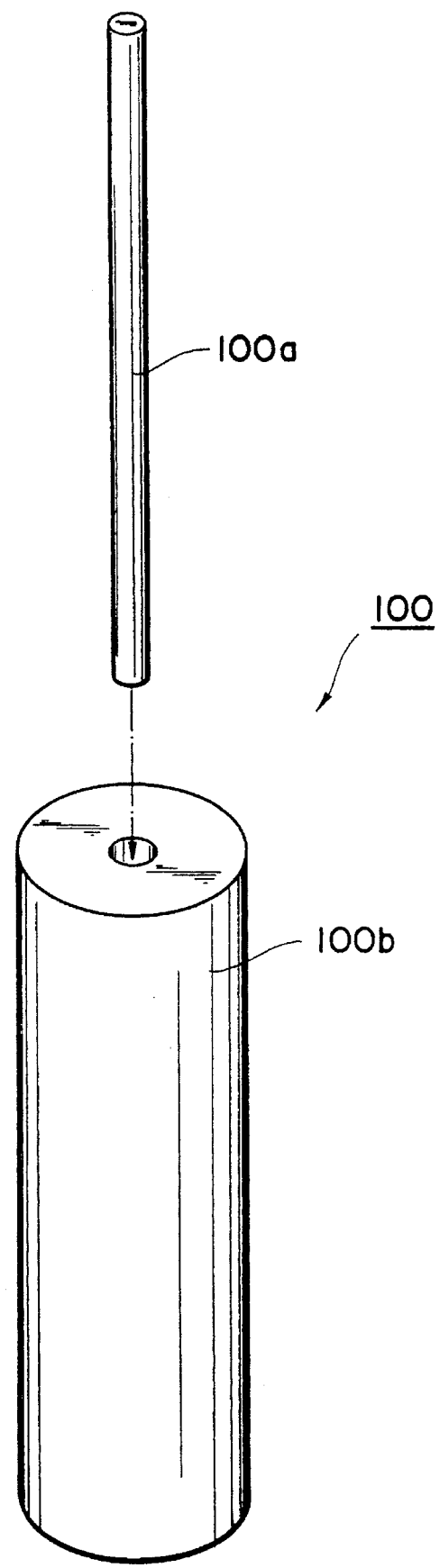
FIG. 2 is a view showing a method of fabricating the optical fiber preform shown in FIG. 1B.

The fiber preform of this embodiment was fabricated by the rod-in-tube method shown in FIG. 2. More specifically, a hole is formed in a cladding material 100b, and a core material 100a is inserted into the hole, thereby fabricating the preform 100.

Figure 8:
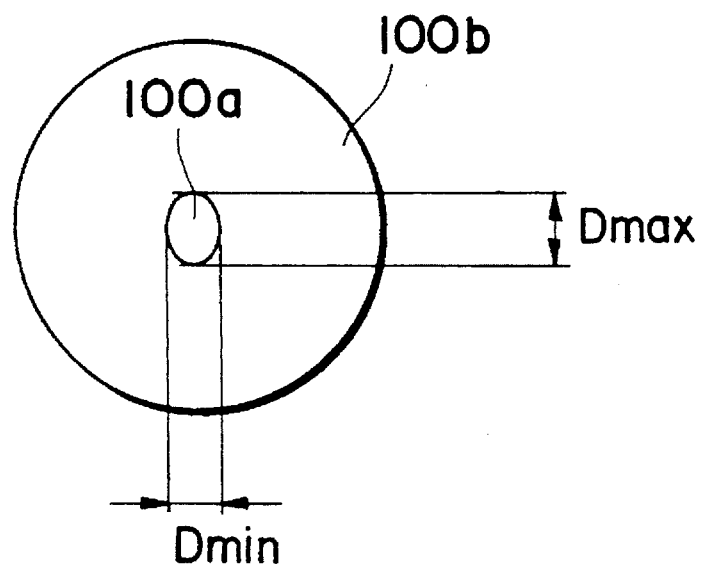
FIG. 8 shows a cross section of the fiber preform shown in FIG. 2.

The noncircularity (%) of the core material 10a is 1% or less. The noncircularity of the core material is defined as shown in FIG. 8:

$$\text{Noncircularity } (\%)=(D_{max}-D_{min})/D_{max}\times 100$$

where Dmax is the maximum value of the diameter of the core material 100a, and Dmin is the minimum value of the diameter of the core material 100a.

The optical fiber preform 100 is fixed to a rotational chuck 210 and set in a drawing furnace 200. Upon driving a motor 220, the optical fiber preform 100 is rotated almost about its central axis (rotational speed $v_R$=10 to 1,000 rpm) as the center of rotation.

At this time, the lower end of the optical fiber preform 100 is heated by a heater 230 to draw an optical fiber 150 (drawing speed $v_P$=50 to 350 m/min). The drawn optical fiber 150 passes through a reaction tube 400 for forming a carbon film. A gas containing CHCl$_3$ and C$_2$H$_4$ is supplied into the reaction tube 250. The CHCl$_3$ and C$_2$H$_4$ in the gas are reacted on the surface of the optical fiber 150. Carbon sticks to the surface of the optical fiber to form a carbon film 151.

Since the optical fiber 150 executes a spindle-like motion in the reaction tube 250, the carbon film 151 with a high uniformity is formed. The outer diameter of an optical fiber 160 coated with carbon is measured by a laser outer diameter measurement device 300. In accordance with the rotation of the optical fiber preform 100, the resultant optical fiber 100 is formed into not a linear shape but a spindle-like shape. The laser outer diameter measurement device 300 has a measurable area allowing outer diameter measurement even when the position of the target measurement object is changed by the motion of the optical fiber 160.

In this embodiment, the measurable area is 5 mm$^2$. The necessary measurable area depends on the set position of the laser outer diameter measurement device, though it is normally appropriately selected from a range of 1 to 9 mm$^2$. The measurement result is informed to a drawing control unit 400. The drawing control unit 400 controls the heating temperature or the drawing speed on the basis of the measured value such that the outer diameter has a predetermined value (normally, 125 μm).

When an almost constant number of turns (L [m]) of the core is to be obtained for the overall optical fiber 160, the rotational speed ($v_R$ [rpm]) and the drawing speed ($v_P$ [m/min]) are controlled as follows:

$$L=V_P/V_R=\text{constant value}$$

The optical fiber 160 passing through the laser outer diameter measurement device passes through a liquid resin 510 stored in a resin coating die 500. The resin sticks to the surface of the optical fiber 160 passing through the liquid resin 510. An optical fiber 170 with the resin passes through the irradiation region of a UV lamp 600 to cure the resin and yields a resin-coated optical fiber 180. The resin-coated optical fiber 180 is wound on a drum 700.

A twist of one turn is imparted to the core of the optical fiber 180 (including the optical fibers 150, 160, and 170) obtained in the above manner at a length L=$v_P/v_R$. The distortion in the sectional structure of the optical fiber uniformly appears in all directions of 360° at a predetermined length. Therefore, the entire long optical fiber can equivalently be regarded as an optical transmission line having a round and concentric structure.

The improvement amount of the polarization mode dispersion by this twist is quantitatively described in "A. J. Barlow et al.: APPLIED OPTICS, Vol. 20, No. 17, 1. September 1981, pp. 2962–2968".

$$\text{PMD }(\Phi)=(\tfrac{1}{2}\Phi)\times(B/\lambda)\times\text{PMD }(\Phi=0) \quad (1)$$

where

Φ: number of turns of core per unit length of the optical fiber.

PMD (Φ): polarization mode dispersion (ps/km$_{1/2}$) when the number of turns is Φ.

PMD (0): polarization mode dispersion (ps/km$^{1/2}$) when the number of turns is 0

B: birefringence of the optical fiber (nondimensional)

λ: wavelength of light (km)

PMD=B/C where

C: speed of light=3×10$^5$ km/sec

Note that equation (1) was obtained by substituting the value B at each core noncircularity. The wavelength λ was set to 1.55 μm=1.55×10$^{-7}$ km.

| Core noncircularity (%) | 0.34 | 0.40 | 0.68 | 0.89 |
|---|---|---|---|---|
| B (× 10$^{-6}$) | 1.0 | 1.2 | 2.0 | 3.0 |

FIGS. 7A to 7D are graphs showing the values PMD obtained in accordance with equation (1). As is apparent from these graphs, when the core noncircularity is 1% or less, and the number of turns per unit length is set to 3 turns per meter or more, the value PMD can be set to 0.5 ps/km$^{1/2}$ or less. A dispersion compensation fiber twisted at a rate of 1 to 20 turns per meter is applicable for the optical transmission system of FIG. 3. A dispersion compensation fiber comprised of a material comprising either one of AlF3, ZrF4 and HfF4, and twisted at a rate of 1 to 20 turns per meter is applicable for the system of FIG. 3.

Figure 4:
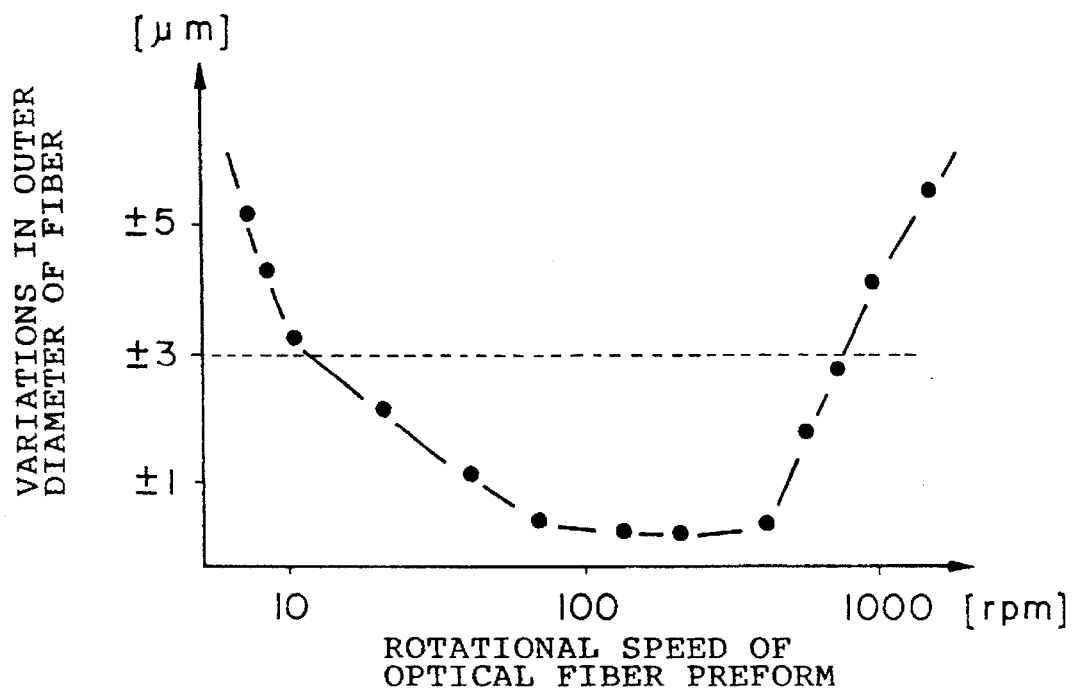
FIG. 4 is a graph showing the relationship between the rotational speed and variations in outer diameter of an optical fiber fabricated by the method of the first embodiment.

FIG. 4 is a graph showing the relationship between the rotational speed (rpm) of the optical fiber preform and variations in outer diameter of the optical fiber (μm). This graph was obtained as a result of an experiment by the present inventors.

Conditions for this experiment were as follows.

Material of preform: quarts glass (silica glass)

Outer diameter of preform 100: 36 mm

GeO$_2$ concentration in core 100a: 10 mol %

Drawing speed: 100 m/min

Drawing tension: 6.5 kg/mm$^2$ (corresponding to an applied tension of 80 g for a completed fiber with a diameter of 125 μm)

The shape of the preform and the concentration of the dopant match those of the fiber fabricated from this preform. FIG. 1E is a view showing the cross section of the fabricated optical fiber and the refractive index profile thereof. The diameter of a core 1100a is 5 μm. The diameter of a cladding 1100b is 125 μm. The thickness of the carbon film 151 is 300 Å. The thickness of the resin is 58 μm.

The diameter of the core 1100a may also be 2 μm to 6 μm. The diameter of the cladding 1100b may also be 122 to 128 μm. The thickness of the carbon film 151 may also be 100 to 1000 Å. The thickness of the resin may also be 20 to 70 μm. The GeO$_2$ concentration of the core 1100a is 10 mol %. However, it may also be 7 mol/% to 30 mol %. The F concentration of the cladding 1100b is 0.5 wt %. However, it also may also be 0.1 wt % to 1 wt %.

Variations in outer diameter of the optical fiber is associated with a transmission loss. As the variations in outer diameter become smaller, the transmission loss also becomes smaller. In an optical fiber having a diameter of 125 μm for practical use, the variations in outer diameter preferably fall within a range of about ±3 μm. As is apparent from the graph of FIG. 4, when the rotational speed is 10 to 1,000 rpm, the variations in outer diameter fall within a range of about ±3 μm.

The reason for this is as follows. That is, at a low rotational speed of 10 rpm or less, the rotation of the optical fiber preform is not stabilized. To the contrary, at a high rotational speed of 1,000 rpm or more, neckdown occurs at the heated and softened portion of the optical fiber due to the centrifugal force. To minimize the variations in outer diameter, the rotational speed must be set to 50 to 600 rpm, as is apparent from the graph of FIG. 4.

Figure 5:
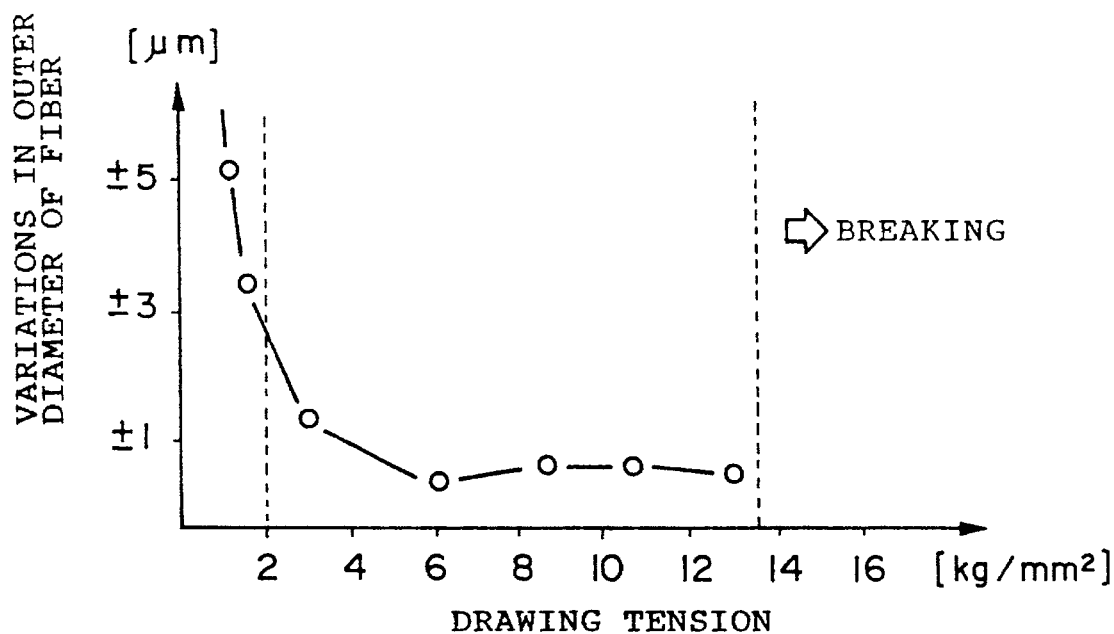
FIG. 5 is a graph showing the relationship between the drawing tension and variations in outer diameter of the optical fiber fabricated according to the first embodiment.

FIG. 5 is a graph showing the relationship between the drawing tension applied to the optical fiber preform and variations in outer diameter of the optical fiber. This graph was obtained as a result of an experiment by the present inventors. Conditions for the experiment are as follows.

Material of preform: quartz glass (silica glass)

Outer diameter of preform 100: 36 mm

GeO$_2$ concentration in core 100a: 10 mol %

Drawing speed: 100 m/min

Rotational speed: 300 rpm

As is apparent from the graph of FIG. 5, to minimize the variations in outer diameter, the drawing tension is preferably set to 2.4 to 13 kg/mm$^2$. The reason for this is as follows. That is, at a drawing tension of 2.4 kg/mm$^2$ or less, the final outer diameter becomes unstable because of a large whirling of the resultant optical fiber. At a drawing tension of 13 kg/mm$^2$ or more, breaking of the optical fiber usually occurs. At a drawing tension of 16 kg/mm$^2$ or more, the optical fiber is always broken.

Figure 6:
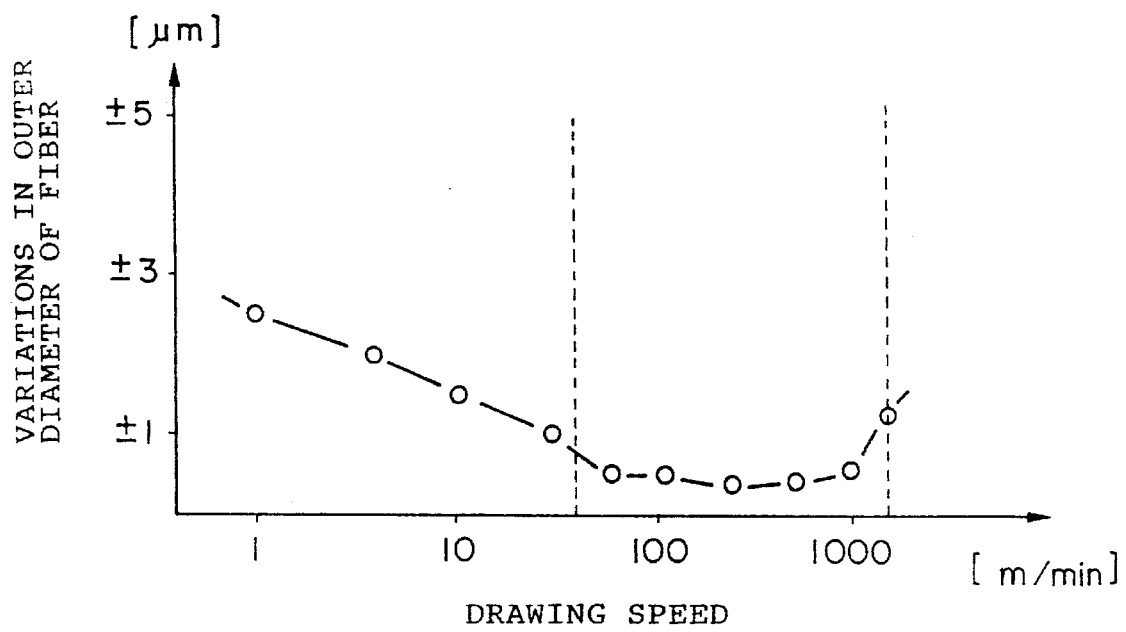
FIG. 6 is a graph showing the relationship between the drawing speed and variations in outer diameter of the optical fiber fabricated according to the first embodiment.
Figure 7A:
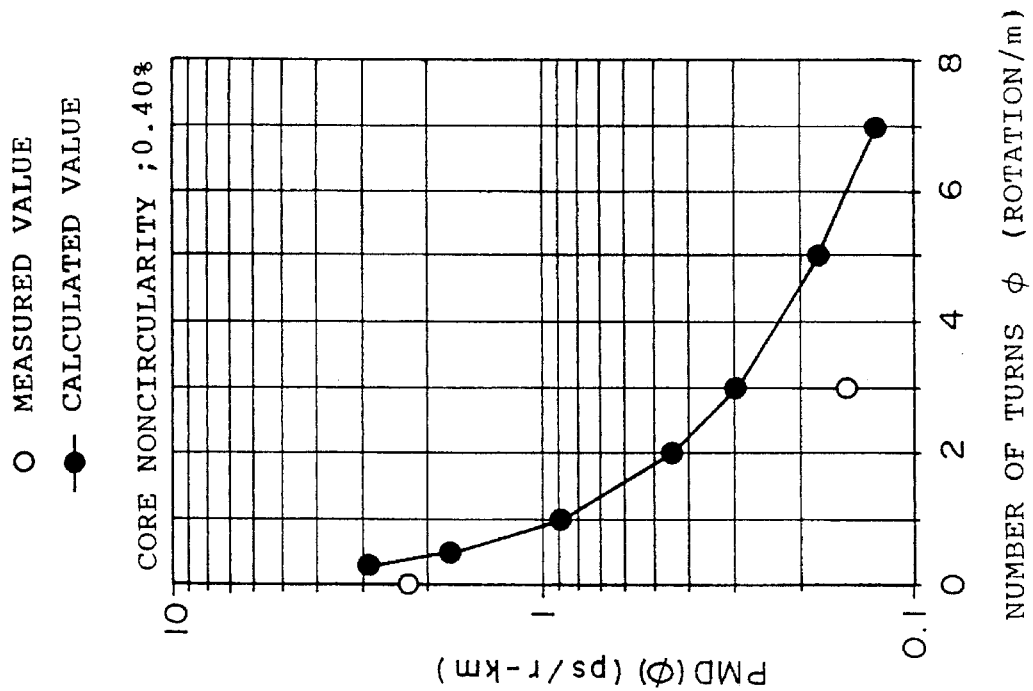
FIG. 7A is a graph showing the polarization mode dispersion (ps/km$^{1/2}$) of a fiber fabricated using a preform having a core with a noncircularity of 0.34(%), in which the number of turns (rotation/m) of the preform during drawing is plotted along the abscissa while the polarization mode dispersion (ps/km$^{1/2}$) of an optical fiber fabricated at the number of turns is plotted along the ordinate, a white circle represents a measured value, and a black circle represents a calculated value.
Figure 7B:
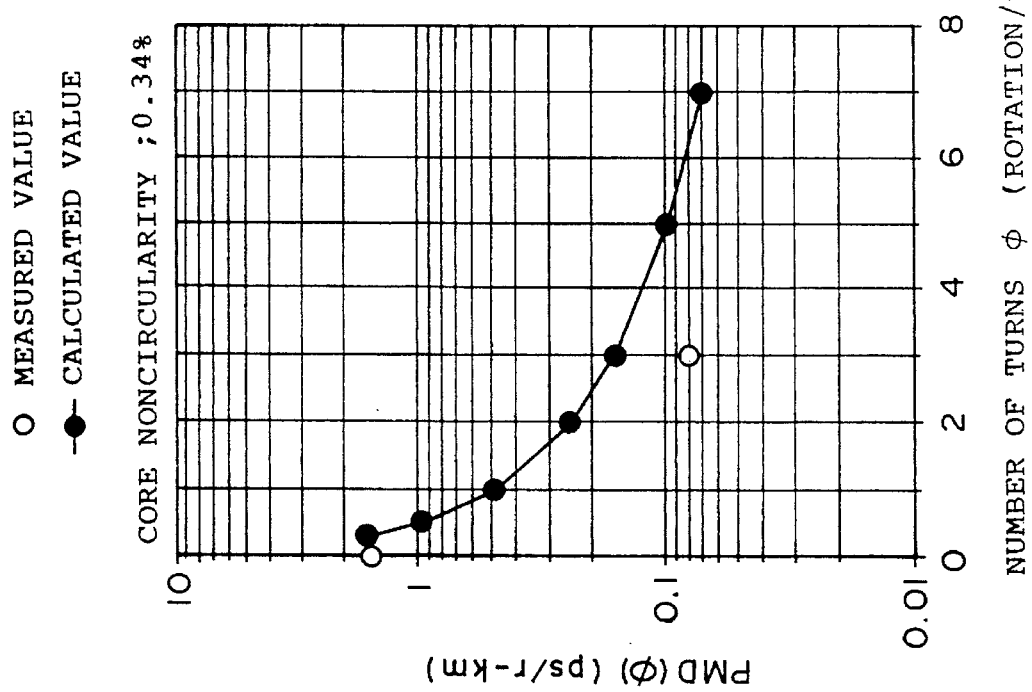
FIG. 7B is a graph showing the polarization mode dispersion (ps/km$^{1/2}$) of a fiber fabricated using a preform having a core with a noncircularity of 0.40(%), in which the number of turns (rotation/m) of the preform during drawing is plotted along the abscissa while the polarization mode dispersion (ps/km$^{1/2}$) of na optical fiber fabricated at the number of turns is plotted along the ordinate, a white circle represents a measured value, and a black circle represents a calculated value.
Figure 7C:
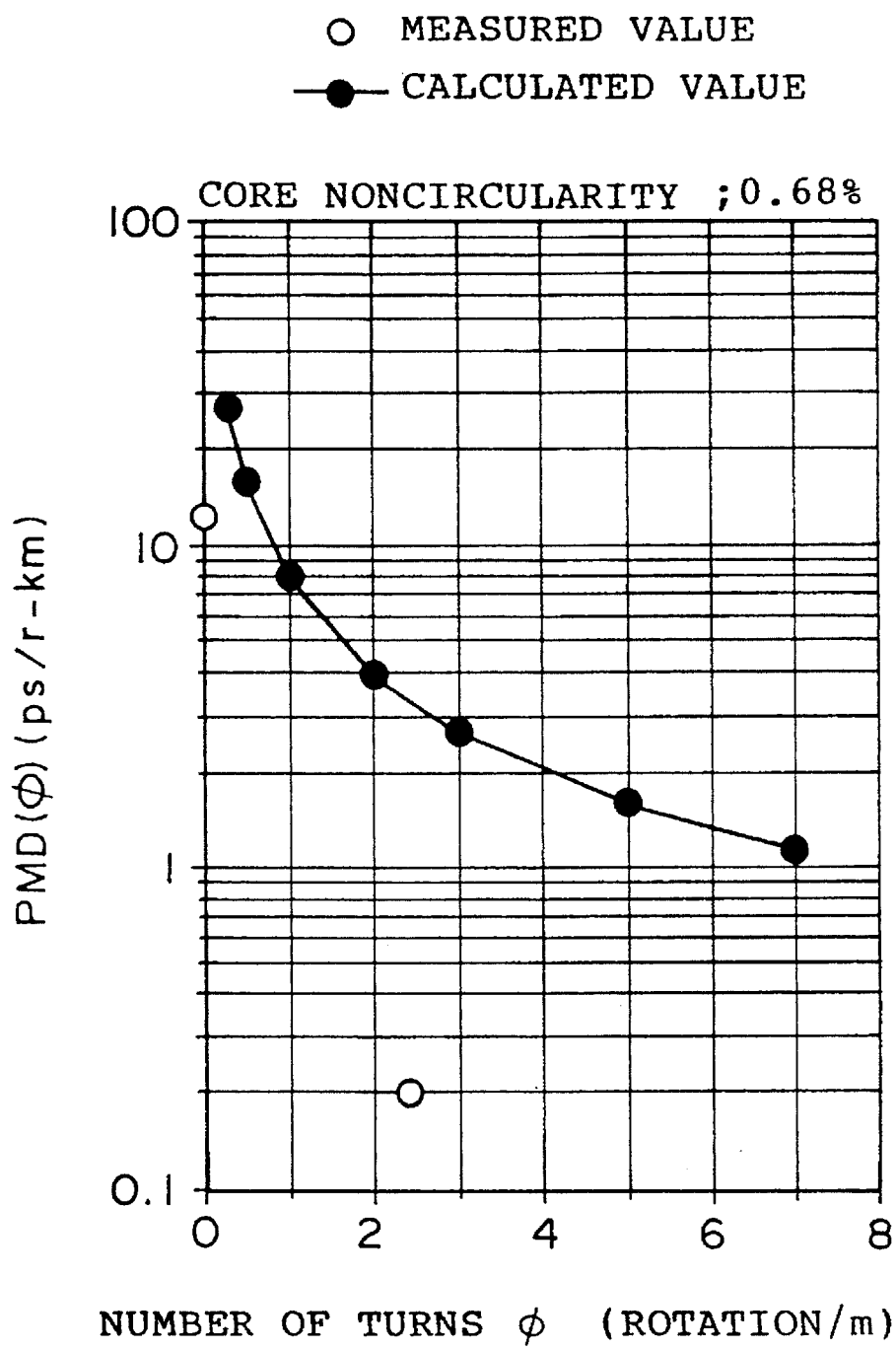
FIG. 7C is a graph showing the polarization mode dispersion (ps/km$^{1/2}$) of a fiber fabricated using a preform having a core with a noncircularity of 0.68(%), in which the number of turns (rotaion/m) of the preform during drawing is plotted along the abscissa while the polarization mode dispersion (ps/km$^{1/2}$) of an optical fiber fabricated at the number of turns is plotted along the ordinate, a white circle represents a measured value, and a black circle represents a calculated value.
Figure 7D:
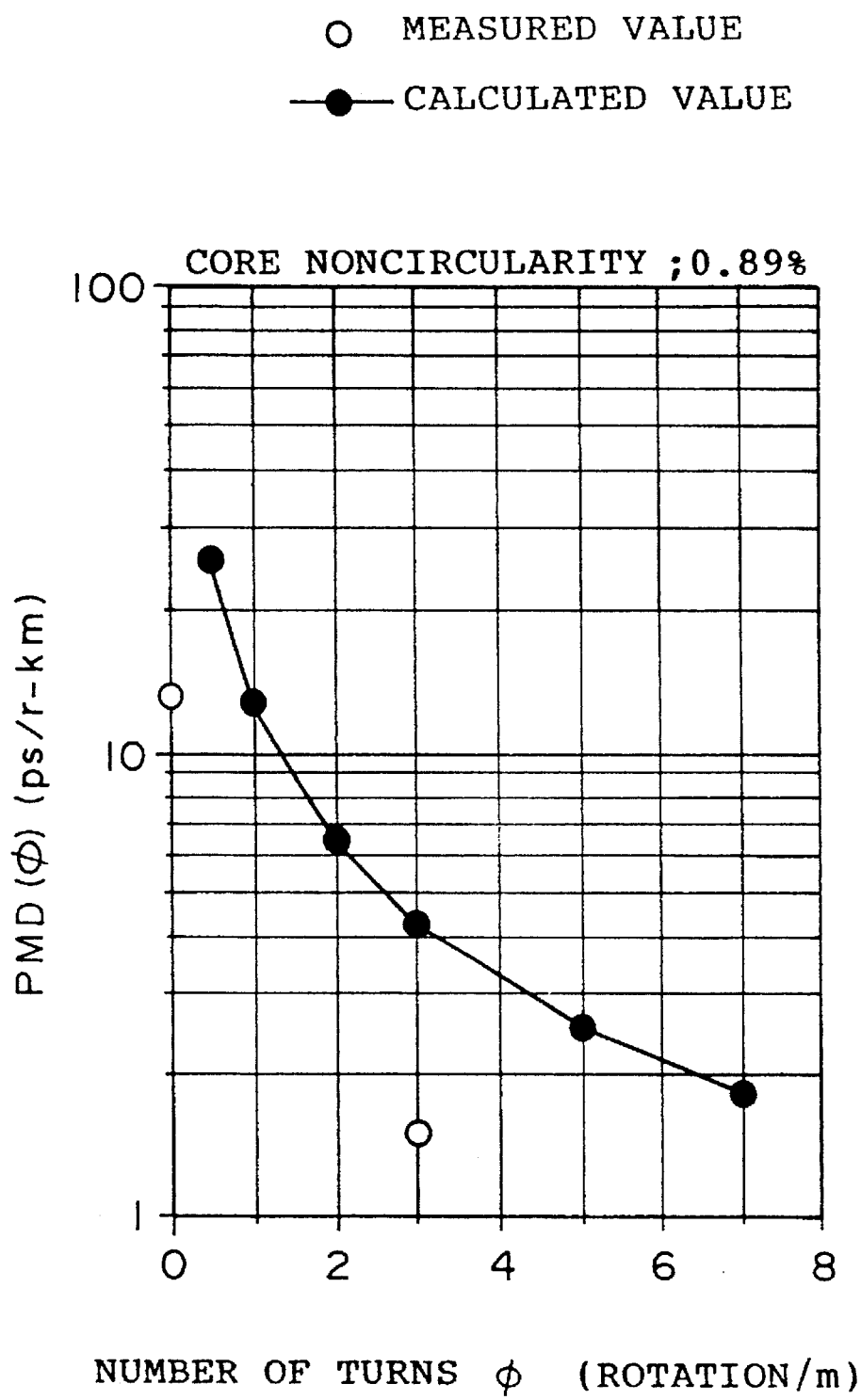
FIG. 7D is a graph showing the polarization mode dispersion (ps/km$^{1/2}$) of a fiber fabricated using a preform having a core with a noncircularity of 0.89(%), in which the number of turns (rotation/m) of the preform during drawing is plotted along the abscissa while the polarization mode dispersion (ps/km$^{1/2}$) of an optical fiber fabricated with the number of turns is plotted along the ordinate, a white circle represents a measured value, and a black circle represents a calculated value.
Figure 7E:
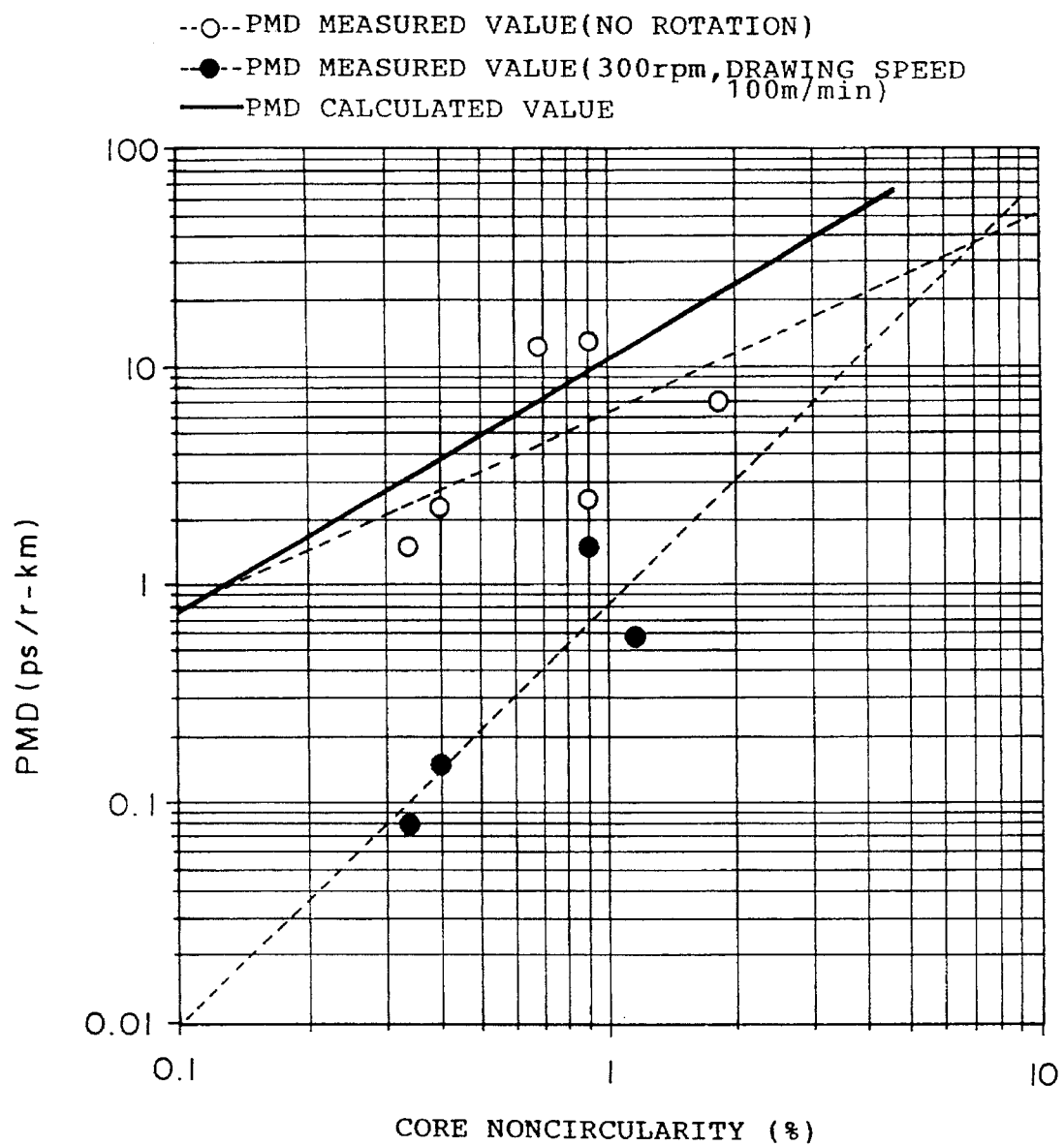
FIG. 7E is a graph showing the polarization mode dispersion (ps/km$^{1/2}$) of a fiber fabricated using a preform having a core with a noncircularity of 0.1–10 (%), a white circles represent the measured PMD values of the fibers formed without rotation, and a black circles represent the measured PMD values of the fibers formed while keeping rotation, a solid line represents the calculated value of PMD.

FIG. 6 is a graph showing the relationship between the drawing speed of the optical fiber and variations in outer diameter of the optical fiber. This graph was obtained as a result of an experiment by the present inventors. Conditions for the experiment are as follows:

Material of preform: quartz glass (silica glass)

Outer diameter of preform 100: 36 mm

GeO$_2$ concentration in core 100a: 10 mol %

Rotational speed: 300 rpm

Drawing tension: 10 kg/mm$^2$

As is apparent from the graph of FIG. 6, to minimize the variations in outer diameter, the drawing speed is preferably set to 50 to 1,000 m/min.

The relationships shown by the graphs of FIGS. 4 to 6 are experimental results under the above conditions. Even when the rotational speed, the drawing tension, and the drawing speed vary within the preferable ranges perceived from FIGS. 4 to 6, the same relationships as described above can be observed.

An embodiment of the method of fabricating an optical fiber based on silica glass has been described above. Consider the viscosity of silica glass in softening and the viscosity of fluoride glass used as the material of the optical fiber in softening. In this case, ① the rotational speed ($v_R$) is preferably 10 to 500 rpm in consideration of the stability and realization of rotation, ② the drawing speed ($v_P$) is preferably 1 m/min or more from the viewpoint of the stability of drawing and 200 m/min or less from a practical viewpoint for preventing the fiber from being broken during drawing, and ③ the drawing tension is preferably 2.4 to 13 kg/mm$^2$ in consideration of the viscosity of fluoride glass as the material of the optical fiber in softening.

An optical fiber having the refractive index profile (A type) in FIG. 1E was fabricated. Fabrication conditions and characteristics of the optical fiber are shown in Tables I to V.

TABLE I

| Sample No. | A-1 | A-2 | A-3 | A-4 |
|---|---|---|---|---|
| Fiber structure | | | | |
| Profile type | A | A | A | A |
| $\Delta^+$ (%) | 2.6 | 2.6 | 2.6 | 2.6 |
| $\Delta^-$ (%) | 0.36 | 0.36 | 0.36 | 0.36 |
| Ra | — | — | — | — |
| 2Da (μm) | 2.2 | 2.2 | 2.2 | 2.2 |
| Drawing | | | | |
| Rotational speed (r/min) | 300 | 0 | 400 | 500 |
| Drawing speed (m/min) | 100 | 100 | 100 | 100 |
| Drawing tension (kg/mm$^2$) | 13 | 13 | 13 | 13 |
| Characteristics | | | | |
| Variations in fiber diameter (μm) | ±0.2 | ±0.2 | ±0.5 | >±1 |
| Polarization mode dispersion (ps/km$^{1/2}$) | 0.1 | 2.0 | 0.08 | 0.05 |
| Dispersion value (ps/km/nm) | −95 | −95 | −95 | −95 |
| Dispersion slope (ps/km/nm$^2$) | +0.09 | +0.09 | +0.09 | +0.09 |
| Transmission loss (dB/km) | 0.38 | 0.38 | 0.38 | 0.38 |
| Figure of merit (ps/nm/dB) | 250 | 250 | 250 | 250 |
| Preform core noncircularity (%) | 0.35 | 0.35 | 0.35 | 0.35 |

TABLE II

| Sample No. | A-5 | A-6 | A-7 | A-8 |
|---|---|---|---|---|
| Fiber structure | | | | |
| Profile type | A | A | A | A |
| $\Delta^+$ (%) | 2.6 | 2.6 | 2.6 | 2.6 |
| $\Delta^-$ (%) | 0.36 | 0.36 | 0.36 | 0.36 |
| Ra | — | — | — | — |
| 2Da (μm) | 2.2 | 2.2 | 2.2 | 2.2 |
| Drawing | | | | |
| Rotational speed (r/min) | 200 | 300 | 300 | 300 |
| Drawing speed (m/min) | 100 | 100 | 100 | 100 |
| Drawing tension (kg/mm$^2$) | 13 | 3 | 13.8 | 14.5 |
| Characteristics | | | | |
| Variations in fiber diameter (μm) | ±0.2 | >±1 | ±0.2 | Breaking |
| Polarization mode dispersion (ps/km$^{1/2}$) | 0.3 | 0.1 | 0.1 | |
| Dispersion value (ps/km/nm) | −95 | −95 | −95 | |
| Dispersion slope (ps/km/nm$^2$) | +0.09 | +0.09 | +0.09 | |
| Transmission loss (dB/km) | 0.38 | 0.38 | 0.38 | |
| Figure of merit (ps/nm/dB) | 250 | 250 | 250 | |
| Preform core noncircularity (%) | 0.35 | 0.35 | 0.35 | 0.35 |

TABLE III

| Sample No. | A-9 | A-10 | A-11 | A-12 |
|---|---|---|---|---|
| Fiber structure | | | | |
| Profile type | A | A | A | A |
| $\Delta^+$ (%) | 2.6 | 2.0 | 3.0 | 2.6 |
| $\Delta^-$ (%) | 0.36 | 0.36 | 0.36 | 0.36 |
| Ra | — | — | — | — |
| 2Da (μm) | 2.2 | 2.5 | 2.0 | 2.2 |
| Drawing | | | | |
| Rotational speed (r/min) | 300 | 300 | 300 | 300 |
| Drawing speed (m/min) | 1000 | 100 | 100 | 100 |
| Drawing tension (kg/mm$^2$) | 13 | 13 | 13 | 13 |
| Characteristics | | | | |
| Variations in fiber diameter (μm) | ±0.5 | ±0.2 | ±0.5 | ±0.2 |
| Polarization mode dispersion (ps/km$^{1/2}$) | 0.8 | 0.08 | 0.3 | 4.0 |
| Dispersion value (ps/km/nm) | −95 | −80 | −120 | −95 |
| Dispersion slope (ps/km/nm$^2$) | +0.09 | +0.09 | +0.08 | +0.09 |
| Transmission loss (dB/km) | 0.38 | 0.38 | 0.61 | 0.38 |
| Figure of merit (ps/nm/dB) | 250 | 242 | 197 | 250 |
| Preform core noncircularity (%) | 0.35 | 0.36 | 0.39 | 1.0 |

TABLE IV

| Sample No. | A-13 | A-14 | A-15 | A-16 |
|---|---|---|---|---|
| Fiber structure | | | | |
| Profile type | A | A | A | A |
| $\Delta^+$ (%) | 2.6 | 2.6 | 0.8 | 0.8 |
| $\Delta^-$ (%) | 0.36 | 0 | 0 | 0 |
| Ra | — | — | — | — |
| 2Da (μm) | 2.2 | 2.2 | 5.0 | 5.0 |
| Drawing | | | | |
| Rotational speed (r/min) | 0 | 300 | 0 | 300 |
| Drawing speed (m/min) | 100 | 100 | 100 | 100 |
| Drawing tension (kg/mm$^2$) | 13 | 13 | 13 | 13 |
| Characteristics | | | | |
| Variations in fiber diameter (μm) | ±0.2 | ±0.2 | ±0.1 | ±0.2 |
| Polarization mode dispersion (ps/km$^{1/2}$) | 30 | 0.1 | 0.12 | 0.008 |
| Dispersion value (ps/km/nm) | −95 | −95 | +1 | +1 |
| Dispersion slope (ps/km/nm$^2$) | +0.09 | +0.09 | +0.08 | +0.08 |
| Transmission loss (dB/km) | 0.38 | 0.9 | 0.21 | 0.21 |
| Figure of merit (ps/nm/dB) | 250 | 106 | x | x |
| Preform core noncircularity (%) | 1.0 | 0.35 | 0.35 | 0.35 |

TABLE V

| Sample No. | A-17 | A-18 |
|---|---|---|
| Fiber structure | | |
| Profile type | A | A |
| $\Delta^+$ (%) | 0.8 | 0.4 |
| $\Delta^-$ (%) | 0 | 0 |
| Ra | — | — |
| 2Da (nm) | 10.0 | 10.0 |

TABLE V-continued

| Sample No. | A-17 | A-18 |
|---|---|---|
| Drawing | | |
| Rotational speed (r/min) | 0 | 300 |
| Drawing speed (m/min) | 100 | 100 |
| Drawing tension (kg/mm$^2$) | 13 | 13 |
| Characteristics | | |
| Variations in fiber diameter (μm) | ±0.1 | ±0.2 |
| Polarization mode dispersion (ps/km$^{1/2}$) | 0.15 | 0.006 |
| Dispersion value (ps/km/nm) | +17 | +17 |
| Dispersion slope (ps/km/nm$^2$) | +0.06 | +0.06 |
| Transmission loss (dB/km) | 0.19 | 0.19 |
| Figure of merit (ps/nm/dB) | x | x |
| Preform core noncircularity (%) | 0.38 | 0.38 |

A method of fabricating an optical fiber according to the second embodiment will be described below. A fabricating apparatus shown in FIG. 9A is the same as that shown in FIG. 1A. FIG. 9B is a view showing an optical fiber preform 800 set in this apparatus. The preform 800 is fabricated by the rod-in-tube method shown in FIGS. 9D and 9E.

First, a cylindrical rod for core 13 and a cylindrical rod for first cladding 11 are fabricated by the VAD method. The core rod 13 is silica glass doped with GeO$_2$. A doping amount of GeO$_2$ is adjusted so that the refractive index decreases in proportion to the second power to the fifth power of distance toward the periphery from the center. The refractive index in the core rod 13 may be arranged to decrease stepwise with an increase of distance away from the center. The first cladding 11 is silica glass uniformly doped with fluorine.

The first cladding rod 11 is perforated to form a hole 11h for inserting the core rod 13 thereinto. Then the core rod 13 is inserted into the hole 11h.

Next, a cylindrical rod for second cladding 12 is fabricated by the VAD method. The second cladding rod 12 is pure silica glass. The second cladding rod 12 is perforated to form a hole 12h for inserting the first cladding rod 11 thereinto. Then the first cladding rod 11 with the core rod 13 therein is inserted into the hole 12h, and the combination is heated to complete a preform 800.

Figure 9C:
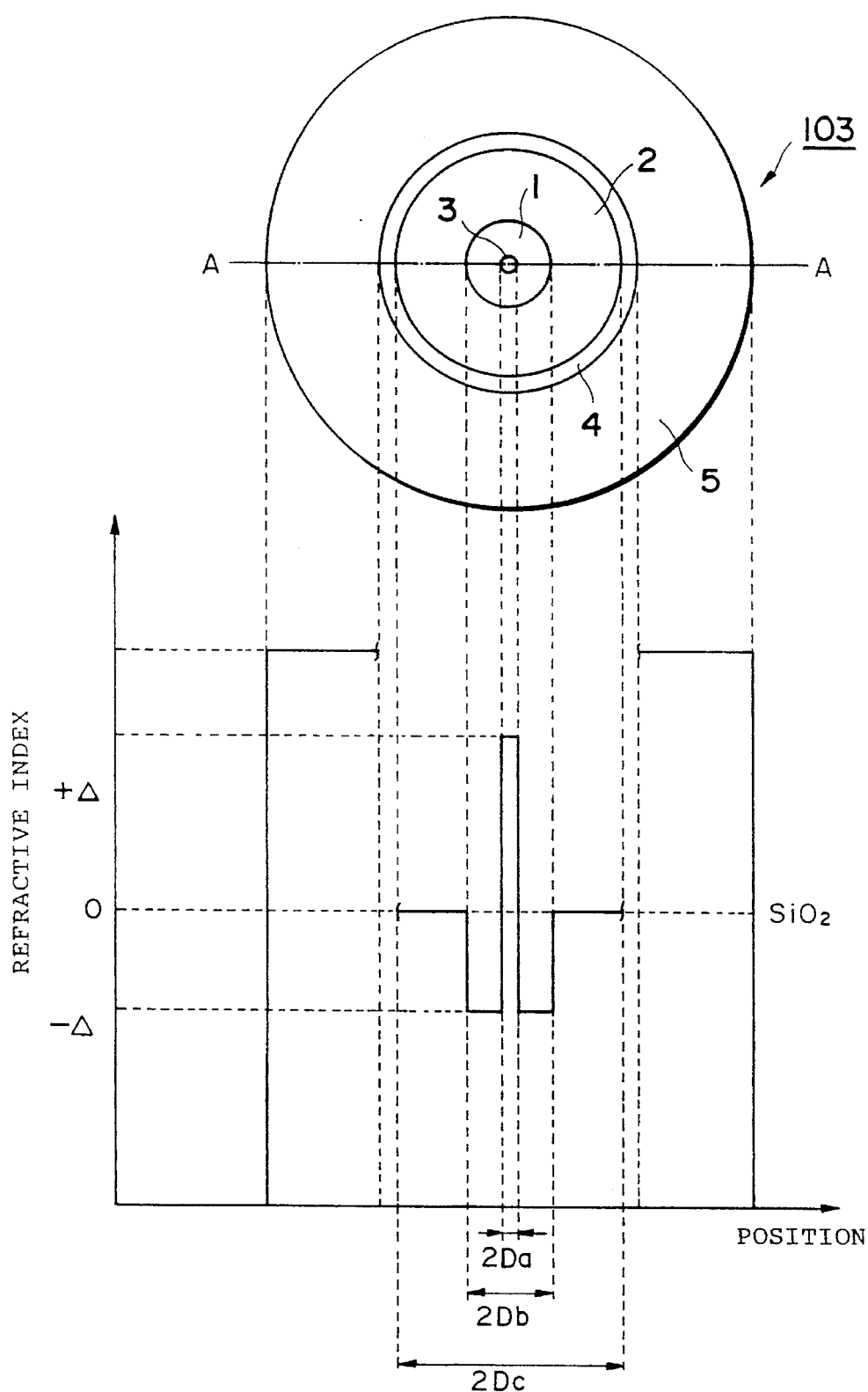
FIG. 9C is a view showing the cross section of the optical fiber of FIG. 9A taken along an arrow X—X and a refractive index profile thereof.

This preform 800 is drawn using the apparatus shown in FIG. 9A to produce a fiber 103. One end of the preform 800 is heated by a heater 230, so that the one end is fused. The fused one end of the preform 800 is cooled to yield an optical fiber. The optical fiber is wound around a take-up reel (bobbin) 700 via a pulley PL1. A glass fiber drawn from the preform 800 is coated with a carbon film 4 by a carbon coat apparatus 250. The carbon film 4 is coated with a jacket material (resin film) 5. The optical fiber shown in FIG. 9C is the optical fiber 103 rolled around the take-up reel 700 in FIG. 9A. The refractive index of the resin film 5 is higher than that of the second cladding.

The optical fiber shown in FIG. 9C will be next described. This dispersion compensation fiber is a "double-cladding" fiber. This dispersion compensation optical fiber is provided with a core 3, a first cladding 1 surrounding the core 3, a second cladding 2 surrounding the first cladding 1, the carbon coating 4, and the resin coat 5 surrounding the second cladding 2.

The refractive index of the second cladding 2 is lower than that of the core but higher than that of the first cladding. When the refractive index of the core 3 is nc, that of the first cladding 1 n1, and that of the second cladding 2 n2, the following relation holds between these refractive indies. That is, n1<n2<nc. A refractive index n5 of the resin 5 is higher than that of the second cladding 2 and higher than that of the core 3.

The diameter (2Da) of the core 3 is larger than 2 μm but smaller than 4 μm. The ratio Ra=(Da/Db) of the diameter (2Da) of the core 3 to the outer diameter (2Db) of the first cladding 1 is between 0.3 and 0.6. A specific refractive index difference of the core 3 to the second cladding 2, Δ$^+$=(nc−n2)/n2, is larger than 0.02 but smaller than 0.03. A specific refractive index difference of the first cladding 1 to the second cladding 2, Δ$^-$=(n2−n1)/n2, is larger than 0.004 but smaller than 0.01. Furthermore, a bending loss L$_{bend}$ of this fiber at the wavelength 1.55 μm with a bending diameter 2R (where R is a radius of curvature of dispersion compensation fiber) being lower than 40 mm is below 0.01 dB/m. The outer diameter (2Dc) of the second cladding 2 is 125 μm. The diameter (2Da) of the core 3 in the dispersion compensation fiber is between 2.4 μm and 3.2 μm both inclusive of 2Dc. This is smaller than the core diameter of the conventional single-mode fiber (10 μm of 2Dc).

In summary, the dispersion compensation fiber of this embodiment has the following relations:

n1<n2<nc<n5,

2 μm<2Da<4 μm, 0.3<(Da/Db)<0.6, 0.02<Δ$^+$=(nc−n2)/n2<0.03, 0.003<Δ$^-$=(n2−n1)/n2<0.01, 40 mm≦2R≦80 mm,

L$_{bend}$<0.01 dB/m (2R=40 mm),

L$_{bend}$<0.000001 dB/m (2R=80 mm),

PMD<0.05ps/$\sqrt{km}$

Figure 3:
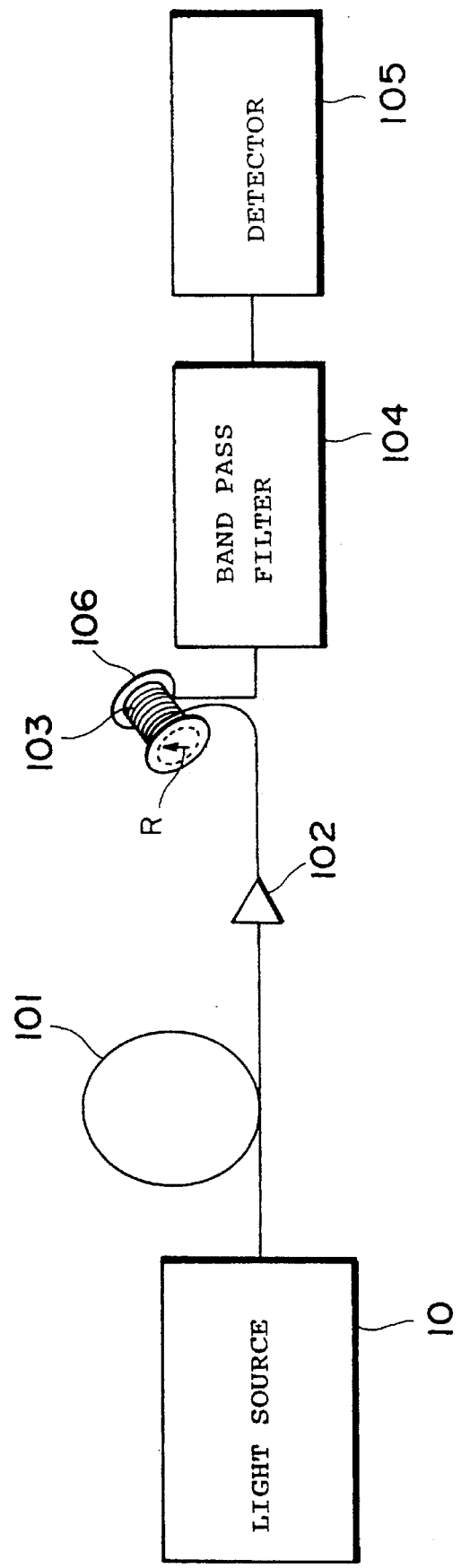
FIG. 3 is a block diagram showing a system using a dispersion compensation fiber.

Now, the characteristics of the dispersion compensation optical fiber according to this embodiment will be described. FIG. 3 shows an optical transmission system using the above dispersion compensation fiber. This system is provided with a light source 10, a transmission link 101 for connecting the light source to a fiber amplifier 102, a dispersion compensation fiber 103 connected to the erbium-doped fiber 102 and wound around a bobbin 106, a band-pass filter 104 connected to the dispersion compensation fiber 103, and a detector 105 connected to the band-pass filter 104. The transmission link 101 is a single-mode optical fiber 101 having zero dispersion at a predetermined wavelength between 1,290 nm and 1,330 nm, for example at 1,310 nm. The radius of curvature R of the dispersion compensation fiber 103 thus wound is between 20 mm and 40 mm both inclusive. Accordingly, the bending diameter 2R is between 40 mm and 80 mm both inclusive. The elements other than the dispersion compensation fiber in this system are described in European Laid-Open Patent Application No. 0554714A1. Note that a fiber 170 may also be used in place of the dispersion compensation fiber 103.

Conditions for fabricating the fiber (type B) in FIG. 9C are shown in Table VI.

TABLE VI

| Sample No | B-1 | B-2 | B-3 |
|---|---|---|---|
| Fiber structure | | | |
| Profile type | B | B | B |
| $\Delta^+$ (%) | 2.1 | 2.6 | 3.0 |
| $\Delta^-$ (%) | 0.36 | 0.36 | 0.36 |
| Ra | 0.3 | 0.3 | 0.3 |
| 2Da (μm) | 2.8 | 2.4 | 2.2 |
| Drawing | | | |
| Rotational speed (r/min) | 300 | 300 | 300 |
| Drawing speed (m/min) | 100 | 100 | 100 |
| Drawing tension (kg/mm$^2$) | 13 | 13 | 13 |
| Characteristics | | | |
| Variations in fiber diameter (μm) | ±0.2 | ±0.2 | ±0.2 |
| Polarization mode dispersion (ps/km$^{1/2}$) | 0.07 | 0.12 | 0.28 |
| Dispersion value (ps/km/nm) | −85 | −100 | +175 |
| Dispersion slope (ps/km/nm$^2$) | −0.2 | −0.26 | −0.31 |
| Transmission loss (dB/km) | 0.45 | 0.55 | 1.4 |
| Figure of merit (ps/nm/dB) | 189 | 182 | 125 |
| Preform core noncircularity (%) | 0.38 | 0.36 | 0.37 |

The present invention is not limited to the above embodiments, and various changes and modifications can also be made. For example, in the embodiment of the method of fabricating an optical fiber based on silica glass, the core is highly doped with GeO$_2$. However, the core may also be doped with any dopant other than Ge, and the dopant concentration is not limited. Even with an optical fiber having a doped cladding, the same effect as described above can be obtained according to the same fabricating method.

As has been described above in detail, according to the method of fabricating an optical fiber of the present invention, the optical fiber is fabricated by rotation drawing with appropriate control amounts (rotational speed, drawing speed, and drawing tension). For this reason, even when the optical fiber or the core has no completely round and concentric structure, an optical fiber capable of equivalently suppressing polarization mode dispersion caused due to the noncircularity can be stably fabricated.

In addition, when a reaction tube for forming a carbon film is arranged in a region where the optical fiber executes a spindle-like motion to form a carbon film on the optical fiber, a carbon film with a high uniformity can be formed. Therefore, a high-quality optical fiber having a high resistance to environment and free from variations in outer diameter can be fabricated.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 202091/1994 (6-202091) filed on Aug. 26, 1994, is hereby incorporated by reference.

What is claimed is:

1. A method of fabricating a dispersion compensation fiber, comprising the steps of:

(a) preparing a silica-based optical fiber preform comprising a core and a cladding which surrounds said core, wherein (nc−n1)/n1 is 1% to 3%, where nc is a refractive index of said core and n1 is a refractive index of said cladding; and (b) performing drawing while rotating said optical fiber preform about an axis,
      wherein a rotational speed of said optical fiber preform is 10 to 1,000 rpm,
      a drawing speed is 50 to 1,000 m/min, and
      a drawing tension is greater than 2.4 kg/mm$^2$.

2. A method according to claim 1, wherein the drawing tention is smaller than 16 kg/mm$^2$.

3. A method according to claim 1, wherein the drawing tention is smaller than 13 kg/mm$^2$.

4. A method according to claim 1, wherein said core is doped with GeO$_2$ at a concentration of 5 mol % to 30 mol %, and
   said cladding is doped with F at a concentration of 0.1 to 2 wt %.

5. A method according to claim 1, wherein the drawing speed is 100 to 500 m/min.

6. A method of fabricating a dispersion compensation fiber, comprising the steps of:

(a) preparing a silica-based optical fiber preform comprising a core, a first cladding which surrounds said core and a second cladding which surrounds said first cladding, wherein (nc−n2)/n2 is 2 % to 3 %, and wherein (n2−n1)/n2 is 0.4% to 1%, where nc is a refractive index of said core, n1 is a refractive index of said first cladding, and n2 is a refractive index of said second cladding; and (b) performing drawing while rotating said optical fiber preform about an axis,
      wherein a rotational speed of said optical fiber preform is 10 to 1,000 rpm,
      a drawing speed is 50 to 1,000 m/min, and
      a drawing tension is greater than 2.4 kg/mm$^2$.

7. A method according to claim 6, wherein the drawing tention is smaller than 16 kg/mm$^2$.

8. A method according to claim 6, wherein the drawing tention is smaller than 13 kg/mm$^2$.

9. A method according to claim 6, wherein said core is doped with GeO$_2$ at a concentration of 5 to 30 mol %,
   said first cladding is doped with F at a concentration of 0.1 wt % to 2 wt %.

10. An optical transmission system having a dispersion compensation fiber, wherein said dispersion compensation fiber comprises:

(a) a core; and
   (b) a cladding surrounding said core,
   wherein (nc−n1)/n1 is 1% to 3%,
   a noncircularity of said core is not more than 1%,
   said dispersion compensation fiber is twisted at a rate of 1 to 20 turns per meter, and
   a polarization mode dispersion of said dispersion compensation fiber is not more than 0.5 ps/km$^{-2}$, where nc is a refractive index of said core and n1 is a refractive index of said cladding.

11. A system according to claim 10, wherein said core is doped with GeO$_2$ at a concentration of 5 to 30 mol %, and
   said cladding is doped with F at a concentration of 0.1 wt % to 2 wt %.

12. An optical transmission system having a dispersion compensation fiber, wherein said dispersion compensation fiber comprises (a) a core;
(b) a first cladding surrounding said core; and
(c) a second cladding surrounding said first cladding, wherein (nc−n2)/n2 is 2% to 3%,
(n2−n1)/n2 is 0.4% to 1%,
a noncircularity of said core is not more than 1%,
said dispersion compensation fiber is twisted at a rate of 1 to 20 turns per meter, and
a polarization mode dispersion of said dispersion compensation fiber is not more than 0.5 ps/km$^{-2}$, where nc is a refractive index of said core, n1 is a refractive index of said first cladding, and n2 is a refractive index of said second cladding.

13. An optical transmission system having a dispersion compensation fiber, wherein said dispersion compensation fiber is comprised of a material comprising either one of AlF3, ZrF4 and HfF4, and wherein said dispersion compensation fiber twisted at a rate of 1 to 20 turns per meter.

* * * * *